Feb. 24, 1970 J. V. MARTENS ET AL 3,497,818

CIRCUIT FOR CENTERING PCM ZERO LEVEL

Filed Oct. 21, 1966 2 Sheets-Sheet 1

Feb. 24, 1970 J. V. MARTENS ET AL 3,497,818

CIRCUIT FOR CENTERING PCM ZERO LEVEL

Filed Oct. 21, 1966 2 Sheets-Sheet 2

3,497,818

CIRCUIT FOR CENTERING PCM ZERO LEVEL

Jean Victor Martens, Deurne, and Jacques Pierre Valentin Joseph Vanderkimpen, Edegem, Belgium, assignors to International Standard Electric Corporation, New York, N.Y., a corporation of Delaware Filed Oct. 21, 1966, Ser. No. 588,612
Claims priority, application Belgium, Oct. 22, 1965, 671,257
Int. Cl. H04b 1/10
U.S. Cl. 328—165 10 Claims

ABSTRACT OF THE DISCLOSURE

A composite PCM signal includes the PCM pulses and a low frequency order wire signal. By proper feed back in phase opposition, the PCM pulses are recovered. The composite signal and the PCM pulses are then applied to a difference amplifier so that the difference output is a recovery of the order wire signal.

The present invention relates to a receiver arrangement for a relatively wide band frequency signal, e.g., a digital signal.

In general, substantially constant amplitude and relatively wide band frequency signals, such as data signals, having positive and negative going pulses with respect to a zero level arrive at the receiving end of their transmission path as signals with wandering zero level. This distortion results from the superposition of a low frequency disturbance signal, e.g., due to shifts of the zero level output of the transmitting medium.

Receiver arrangements having automatic zero level restoration are well known in the art, e.g., from the Belgian Patent No. 586,777 (W. K. Bakker 14).

However, automatic zero level restoration in the above known arrangements is performed roughly, so that these arrangements are only suitable for the reception of frequency signals of a relatively high amplitude, whereas they are totally unsuitable for the reception of frequency signals of low amplitude, such as PCM signals which ordinarily have an amplitude of the order of 1 to 2 volts.

Moreover, the above PCM signals may in fact be purposely modified when superposing at their transmitting end an audio signal, i.e., so-called order wire, which must also be recovered at the receiving end. The recovering or separation of this order wire signal cannot be performed by a filtering arrangement because the low frequency components of the PCM signals would then be altered.

Therefore, it is an object of the present invention to provide a receiver arrangement, which does not present the drawbacks of the above mentioned known arrangements.

In accordance with a characteristic of the invention, a receiver arrangement for a relatively wide band frequency input signal, e.g., digital signal, is characterized in that it includes a negative feedback amplifier adapted to produce the low frequency envelope of said signal and to deliver at its output a modified wide band frequency output signal from which said envelope has been substantially subtracted.

In this way, the feedback amplifier effective only on the low frequency envelope, may achieve a suitable attenuation of the signals corresponding to the variable zero level, without affecting the wide band frequency signal.

In accordance with a further characteristic of the invention, a receiver arrangement as characterized above, is further characterized in that it includes a source of current delivering said input signal to said negative feedback amplifier arranged as a current feedback amplifier and developing said output signal across an impedance connected at the junction of said source and said current feedback amplifier.

A current feedback arrangement is particularly suitable in connection with a high frequency transmission system of the PCM type since it becomes possible to entirely avoid the use of transformers.

The feedback current of such an arrangement will include the low frequency envelope component to be recovered, but as it is in the form of a current it is not conveniently extracted without impairing the properties of the feedback arrangement.

Another object of the invention is to achieve the recovery of the low frequency envelope without actually extracting it from the feedback arrangement.

In accordance with another characteristic of the invention, said input signal is constituted by a composite signal made of the superposition of a digital and an audio frequency signal, and that said digital signal which is recovered from the output of sad negative feedback amplifier is applied to a subtractor to be subtracted from said composite signal thereby recovering said audio signal.

The above and other objects and features of the invention will become more apparent and the invention itself will be best understood by referring to the following description of embodiments taken in conjunction with the accompanying drawings in which.

Figure 1:
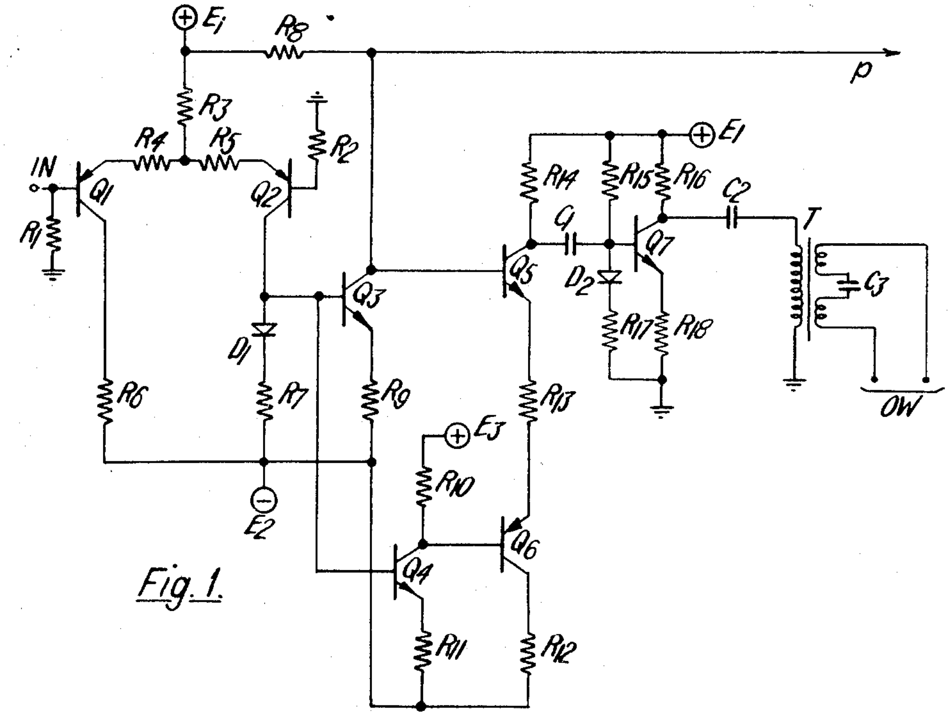
FIGS. 1 and 2 show a first and a second circuit part of a receiver arrangement in accordance with the invention.
Figure 3:
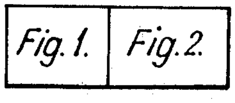
FIG. 3 shows how the circuit parts represented in FIGS. 1 and 2 have to be united.
Figure 2:
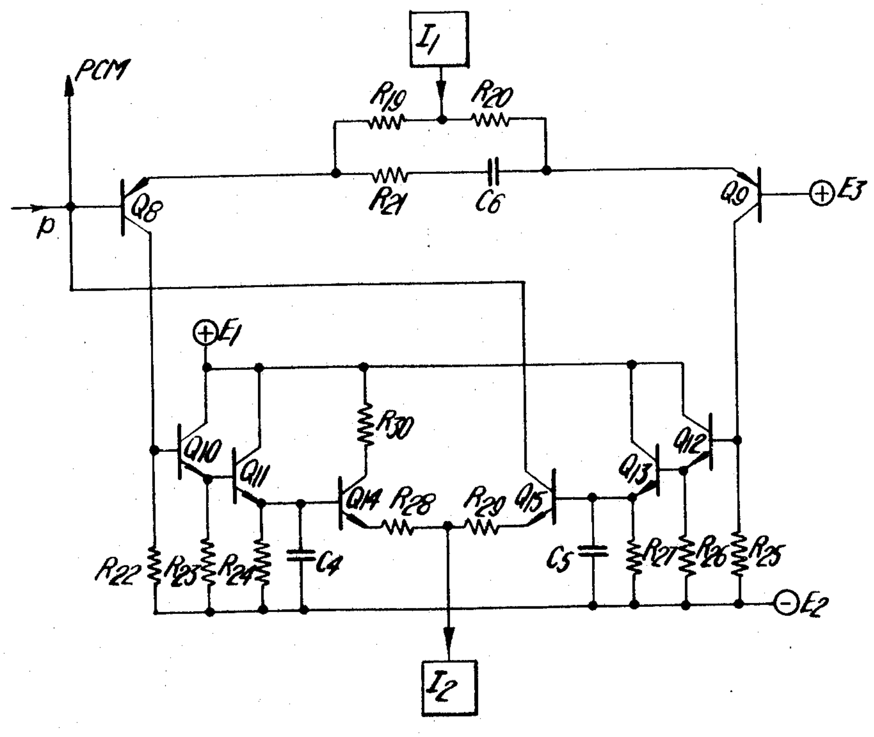

Referring to FIGS. 1 and 2 the receiver circuit arrangement shown therein includes an input preamplifier, which comprises two PNP transistors Q1 and Q2 mounted in a differential amplifier configuration. The base electrodes of the transistors Q1 and Q2 are connected to ground via a resistance R1 and a resistance R2 respectively, the base of the transistor Q1 constituting the input terminal of the preamplifier Q1/Q2, this input terminal being indicated by the reference IN.

The transistors Q1 and Q2 have their emitter electrodes connected to each other through the series connection of two identical resistances R4 and R5 of which the junction point is connected to a source E1 of positive DC fixed potential via a resistance R3. Their collector electrodes are connected to a source E2 of negative DC fixed potential through a resistance R6 and the series connection of a diode D1 and a resistance R7 respectively. The output of the preamplifier Q1/Q2, taken from the collector electrode of the transistor Q2, is connected to the input of a separator circuit comprising two buffer amplifiers which are constituted by two NPN transistors Q3 and Q4. The transistors Q3 and Q4 have their base electrodes common connected. This common connection includes the above input of the separator circuit. The emitter electrodes of transistors Q3 and Q4 are connected to the source E2 through a resistance R9 and a resistance R11 respectively. The collector electrodes of the transistors Q3 and Q4 are connected to the D.C. source E1 and to a D.C. source E3 through a resistance R8 and a resistance R10, respectively. These collectors are also connected to the base electrodes of an NPN and PNP transistor Q5 and Q6, respectively. These transistors Q5 and Q6 constitute a differential amplifier. The emitter electrodes of the transistors Q5 and Q6 are connected to each other through a resistance R13; whereas, their collector electrodes are connected to the source E1 and to the source E2 through a resistance R14 and a resistance R12 respectively. The collector of the transistor Q5 constitutes the output of the differential amplifier Q5/Q6 and is connected to the base electrode of a NPN transistor amplifier Q7 through a decoupling capacitor C1.

The transistor Q7 has, its base electrode further connected to the source E through a resistance R15 and to ground through the series connection of a diode D2 and a resistance R17 and its emitter electrode also connected to ground through a resistance R18. The collector electrode of the transistor Q7, which constitutes its output electrode, is on the one hand connected to the source E1 via a resistance R16 and on the other hand to ground via the series connection of a decoupling capacitor C2 and the primary winding of a transformer T.

The secondary winding of the transformer T which is split in two parts by a center capacitor C3 delivers to a load circuit (not shown) through its free output ends indicated by the reference OW an order wire signal as it will later be described. The diodes D1 and D2 provide for temperature effects compensation of the base-emitter junctions of the respective transistors Q3, Q4 and Q7.

The collector electrode of the buffer amplifier Q3 is connected via a conductor indicated by the reference *p* to the common input-output connection of a negative feedback amplifier arrangement which is shown in FIG. 2. This negative feedback amplifier arrangement, which is a current feedback arrangement, includes a corrector amplifier comprising two PNP transistors Q8 and Q9. The transistors Q8 and Q9 constitute a differential amplifier operating as a voltage/current transducing arrangement with frequency depending gain, have their emitter electrodes connected to each other through, the series connection of a resistance R21 and a capacitor C6 in parallel with the series connection of two identical resistances R19 and R20. The junction point of the resistances R19 and R20 is connected to the output of a constant current generator I1. The sense of the constant current circulation is indicated by the arrow on the above generator I1 output.

The base electrodes of the transistors Q8 and Q9 are connected to the previously mentioned conductor *p* and to the source E3 of positive DC fixed potential, respectively. The collector electrodes of the transistors Q8 and Q9 are connected on the one hand to the source E2 of negative DC fixed potential through two identical resistances R22 and R25 and on the other hand to the base electrodes of two NPN transistors Q10 and Q12 in cascade with two other NPN transistors Q11 and Q13, respectively. The above transistors Q10 to Q13 are mounted in the emitter follower configuration and have their collector electrodes connected to the previously defined source E1 and their emitter electrodes connected to the source E2 through respective resistances R23 to R27 ($R23=R26$, $R24=R27$). The emitter electrodes of the transistors Q10 and Q12 are connected to the base electrodes of the transistors Q11 and Q13 respectively. The emitter electrodes of the transistors Q11 and Q13 are connected on the one hand to the source E2 via two identical capacitors C4 and C5 and on the other hand to the base electrodes of two NPN transistors Q14 and Q15, respectively. The latter transistors Q14 and Q15, constitute a differential amplifier voltage/current transducing arrangement. Their emitter electrodes are connected to each other through the series connection of two identical resistances R28 and R29. The junction point of resistances R28, R29 is connected to the output of a constant current generator I2. The sense of circulation of the constant current supplied by the generator I2 is indicated by the arrow on the output of this generator I2. The collector electrode of the transistor Q14 is connected to the source E1 of positive LC fixed potential through a resistance R30. The collector electrode of the transistor Q15 is connected directly to the junction point of the conductor *p* and the base electrode of the transistor Q8.

As previously mentioned, the other end of the conductor *p* (FIG. 1) is connected directly to the collector electrode of the buffer amplifier Q3 and to the source E1 through the resistance R8. The directly connected base and collector electrodes of the transistors Q8 and Q15 constitute the live input-output common connection of the current feedback amplifier arrangement of FIG. 2. As it will hereinafter be described, this common input-output connection delivers to an output circuit (not shown) of high impedance input, a PCM signal via the conductor indicated by the reference PCM.

The principle of operation of the receiver arrangement will now be described with reference to the accompanying figures and with the assumption that this receiver arrangement constitutes the input of the receiving part of a PCM station having order wire facilities. More precisely it is assumed that the signal applied to the input IN of the preamplifier Q1/Q2 (FIG. 1) is a composite signal made of the superposition of a PCM signal and an order wire signal. The order wire signal is an audio signal, e.g. 30 to 3,000 cycles/sec., having an amplitude lower than that of the PCM signal. Also, in order to facilitate the understanding of the operation of the above receiver arrangement and especially of the previously described negative feedback amplifier arrangement, it will further be assumed for the moment, that the feedback loop of this feedback amplifier arrangement is interrupted by removing the connection between the collector electrode of the transistor Q15 and the base electrode of the transistor Q8. Further assume that the collector electrode of the transistor Q15 is connected to the source E1 through a resistance R'30 (not shown) identical to the resistance R30.

Taking into account the above assumptions, the composite signal applied to the input IN of the preamplifier Q1/Q2 is supplied after preamplification to the base electrodes of the buffer amplifiers Q3 and Q4. This composite signal appears at their collector electrodes and across the respective resistances R8 and R10. The composite signal appearing across the resistance R8 is applied over the conductor P to the base electrode of the transistor Q8 of the corrector amplifier Q8/Q9. This corrector amplifier corrects the relative amplitudes of the PCM signal by highly amplifying the high frequency components of the PCM signal and by amplifying the lower frequency components with a relatively lower and constant amplification factor. The above high amplification of the high frequency components which is achieved by a suitable choice of the values of the resistances R19 to R21, and R22, R25 and of the capacitor C6

$$(R22=R25>R19=R20\gg R21)$$

sufficiently compensates for the large attenuation to which the above high frequency components are subjected in the signal transmission path. The corrector amplifier Q8/Q9 which operates in a voltage/current transducing way provides an output current corresponding to the magnitude of its input signal applied to the base of transistor Q8. This output current circulates from the source I1 of constant current, through the emitter-collector junctions of transistors Q8 and Q9, and the respective collector resistances R22, R25, to the source E2 of negative DC fixed potential.

Due to the constant current operation of the corrector Q8/Q9, the output voltages developed across the resistances R22 and R25 are balanced with respect to each other. These balanced voltages are applied to the inputs of two respective stages Q10, Q11, C4 and Q12, Q13, C5 performing peak detection. The input of these peak detection stages are constituted by the base electrodes of the emitter followers Q10 and Q12. The cascaded arrangements of the emitter followers Q10, Q11 and Q12, Q13 provide the low output impedances enabling the quick loading of the respective capacitors C4 and C5. The relative impedance values of the capacitive and resistive elements of these peak detection stages are chosen for having a low frequency detection effect, i.e. the production of the envelopes of the balanced signals applied to the base electrodes of the transistors Q10 and Q12. In this way the voltage appearing across the capacitors C4 and C5 corresponds to the envelope of the maximum and minimum peaks of the composite signal corrected by the corrector Q8/Q9 respectively. The differential amplifier Q14/Q15 which operates as a voltage/current transducing arrangement performs the half-sum of the above envelopes, this half-sum being developed across the resistance R30 and the previously assumed resistance R'30 (not shown) in two opposite phases. The above half-sum substantially constitutes the previously mentioned order wire and the half-sum developed across the assumed resistane R'30 is in phase opposition with respect to the order wire of the composite signal applied to the base of the transistor Q8.

It is easy now to understand that the order wire signal is substantially eliminated from the base electrode of the transistor Q8 when establishing again the feedback path of the negative feedback amplifier arrangement, i.e. by connecting again the collector of the transistor Q15 to the base of the transistor Q8. In this way, the signal appearing at the collector electrode of the buffer amplifier Q3 and on the output terminal PCM, is the recovered PCM signal.

The recovering of the order wire signal takes place in the following way.

The recovered PCM signal and the composite signal are applied to the base electrodes of the transistors Q5 and Q6, through the collector electrodes of the transistors Q3 and Q4 respectively. The differential amplifier Q5/Q6 subtracts the above recovered PCM signal from the composite signal and the order wire is recovered from the collector electrode of the transistor Q5. The thus recovered order wire is supplied through the amplifier Q7, the transformer T, and the output OW to an output circuit (not shown).

While the principles of the invention have been described above in connection with specific apparatus, it is to be clearly understood that this description is made only by way of example and not as a limitation on the scope of the invention.

What is claimed is:

1. A receiver arrangement comprising:
a signal source having an output, said source providing at said output a composite signal including a wide band frequency signal and a superimposed low fre-frequency signal; circuit means having a negative feedback arrangement, for separating said wide band and said low frequency signals, said circuit means having an input coupled to the output of said source and an output also coupled to said output of said source, and means for extracting said low frequency signal from said composite signal by substantially cancelling said low frequency signal from said composite signal to provide an output signal including substantially only said wide band frequency signal.

2. A receiver arrangement according to claim 1, further including
an impedance coupled in common to said output of said source and said input and said output of said circuit means having said feedback arrangement, said output signal appearing across said impedance.

3. A receiver arrangement according to claim 1, wherein
said circuit means having said feedback arrangement includes
first peak detecting means coupled to said input of said feedback arrangement to extract the maximum peaks of said composite signal,
second peak detecting means coupled to said input of said feedback arrangement to extract the minimum peaks of said composite signal, and
means coupled to said first and second peak detecting means to provide at said output of said feedback arrangement a phase inverted version of said low frequency signal for cancellation thereof from said composite signal.

4. A receiver arrangement according to claim 1, wherein said low frequency extraction means includes means for removing a low frequency signal due to distortion of said wide band frequency signal.

5. A receiver arrangement according to claim 1, wherein said low frequency extraction means includes means for removing a low frequency signal due to an audio frequency intelligence signal.

6. A receiver arrangement according to claim 5, further including
first means coupled to said output of said source and said output of said feedback arrangement, said first means being jointly responsive to said output signal and said composite signal to subtract said output signal from said composite signal to recover said audio frequency intelligence signal.

7. A receiver arrangement according to claim 6, wherein
said first means includes
a differential amplifier having one of its inputs coupled to said output of said source and the other of its inputs coupled to said output of said feedback arrangement, and
an output impedance coupled to said differential amplifier to provide said audio frequency intelligence signal.

8. A receiver arrangement according to claim 7, wherein
said feedback arrangement includes
first peak detecting means coupled to said input of said feedback arrangement to extract the maximum peaks of said composite signal,
second peak detecting means coupled to said input of said feedback arrangement to extract the minimum peaks of said composite signal, and
second means coupled to said first and second peak detecting means to provide at said output of said feedback arrangement a phase inverted version of said audio frequency intelligence signal for cancellation thereof from said composite signal.

9. A receiver arrangement according to claim 1, wherein
said wide band frequency signal is a digital signal having constant amplitude; and
said low frequency signal amplitude modulates said constant amplitude.

10. A receiver arrangement according to claim 9, wherein
said feedback arrangement includes
first means coupled to said input of said feedback arrangement to detect said amplitude modulation of said amplitude, and
second means coupled to said first means to provide at said output of said feedback arrangement a phase inverted version of said amplitude modulation for cancellation thereof from said composite signal.

References Cited

UNITED STATES PATENTS

| | | | |
|---|---|---|---|
| 3,064,197 | 11/1962 | Ek | 329—133 XR |
| 3,403,345 | 9/1968 | Frank et al. | 328—165 |

FOREIGN PATENTS

| | | |
|---|---|---|
| 225,063 | 11/1959 | Australia. |
| 660,192 | 10/1951 | Great Britain. |

DONALD D. FORRER, Primary Examiner

STANLEY T. KRAWCZEWICZ, Assistant Examiner

U.S. Cl. X.R.

329—133; 325—347; 307—233